US011881736B2

(12) United States Patent
Liang et al.

(10) Patent No.: US 11,881,736 B2
(45) Date of Patent: Jan. 23, 2024

(54) POWER SYSTEM

(71) Applicant: ASUSTEK COMPUTER INC., Taipei (TW)

(72) Inventors: Kai-Chun Liang, Taipei (TW); Kian-Ming Chee, Taipei (TW); Chia-Yu Liu, Taipei (TW); Yii-Lin Wu, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 462 days.

(21) Appl. No.: 17/152,520

(22) Filed: Jan. 19, 2021

(65) Prior Publication Data

US 2021/0226457 A1 Jul. 22, 2021

(30) Foreign Application Priority Data

Jan. 21, 2020 (TW) ................................ 109102217

(51) Int. Cl.
*H02J 7/00* (2006.01)
*G06F 13/42* (2006.01)
*H04M 1/725* (2021.01)
*H04M 1/72409* (2021.01)

(52) U.S. Cl.
CPC .......... *H02J 7/007* (2013.01); *G06F 13/4282* (2013.01); *H02J 7/0042* (2013.01); *H02J 7/00308* (2020.01); *H04M 1/725* (2013.01); *H04M 1/72409* (2021.01); *G06F 2213/0042* (2013.01)

(58) Field of Classification Search
CPC ...... H02J 7/007; H02J 7/00308; H02J 7/0042; H02J 1/084; H02J 7/00034; G06F 13/4282; G06F 2213/0042; H04M 1/72409; H04M 1/725; H04M 1/72454
See application file for complete search history.

(56) References Cited

U.S. PATENT DOCUMENTS

| 10,574,073 B2 * | 2/2020 | Han .......................... H02J 1/10 |
| 10,802,560 B2 * | 10/2020 | Hijazi ....................... G06F 1/26 |
| 11,101,673 B2 * | 8/2021 | Mattos ................ H02J 7/00304 |

(Continued)

FOREIGN PATENT DOCUMENTS

| CN | 102938573 B | 8/2014 |
| CN | 204615444 U | 9/2015 |

*Primary Examiner* — Stacy Whitmore
(74) *Attorney, Agent, or Firm* — Muncy, Geissler, Olds & Lowe, P.C.

(57) ABSTRACT

A power system applied to a handheld device including a battery, a first connecting port, a second connecting port, a first detector, a second detector, a power delivery controller, a control unit, and a switching element is provided. The first connecting port is electrically connected to the battery through a first charging path. The second connecting port is electrically connected to the battery through a second charging path. The first detector is electrically connected to the first connecting port to generate a first detection signal. The second detector is electrically connected to the second connecting port to generate a second detection signal. The control unit controls the switching element according to the first detection signal and the second detection signal to selectively electrically connect the power delivery controller to the first connecting port or the second connecting port and controls conduction statuses of the charging paths.

11 Claims, 4 Drawing Sheets

(56) References Cited

U.S. PATENT DOCUMENTS

| | | | | |
|---|---|---|---|---|
| 2007/0024239 A1* | 2/2007 | Park | ........................ | G06F 1/263 |
| | | | | 320/114 |
| 2014/0152234 A1* | 6/2014 | Herrmann | ............... | H02J 7/007 |
| | | | | 320/138 |
| 2015/0194824 A1* | 7/2015 | Tu | ........................ | H02J 7/007 |
| | | | | 320/103 |
| 2016/0190847 A1* | 6/2016 | Han | ........................ | H02J 1/10 |
| | | | | 320/134 |
| 2018/0307290 A1* | 10/2018 | Montero | ................... | G06F 1/28 |
| 2019/0288532 A1* | 9/2019 | Mattos | ................... | H02J 7/0034 |
| 2019/0324510 A1* | 10/2019 | Hijazi | ................... | G06F 1/1613 |
| 2021/0208654 A1* | 7/2021 | Bhattacharjee | ......... | H02J 1/106 |
| 2023/0160265 A1* | 5/2023 | Atkins | ................... | E21B 10/43 |
| | | | | 175/431 |

\* cited by examiner

POWER SYSTEM

CROSS-REFERENCE TO RELATED APPLICATION

The disclosure claims the priority benefit of Taiwan Application Serial No. 109102217, filed on Jan. 21, 2020. The entirety of the above-mentioned patent application is hereby incorporated by reference herein and made a part of the specification.

BACKGROUND OF THE INVENTION

Field of the Invention

The disclosure relates to a power system, and in particular, to a power system applied to a handheld device.

Description of the Related Art

Conventional mobile phones include only one charging port. When the charging port is disposed at the bottom of the mobile phone, the operation of the mobile phone is affected while a charging cable is inserted at the bottom of the mobile phone. Similarly, when the charging port is disposed on a side of the mobile phone, and the mobile phone is operated in a portrait mode, a charging cable inserted at the side of the mobile phone affects the operation.

BRIEF SUMMARY OF THE INVENTION

The disclosure provides a power system applied to a handheld device. The power system includes a battery, a first connecting port, a second connecting port, a first charging path, a second charging path, a first detector, a second detector, a power delivery controller, a control unit, and a switching element.

The first charging path is electrically connected to the battery and the first connecting port. The second charging path is electrically connected to the battery and the second connecting port. The first detector is electrically connected to the first connecting port to generate a first detection signal. The second detector is electrically connected to the second connecting port to generate a second detection signal.

The control unit is electrically connected to the first detector and the second detector to receive the first detection signal and the second detection signal, generates a switching signal according to the first detection signal and the second detection signal, and controls conduction statuses of the first charging path and the second charging path.

The switching element is electrically connected to the control unit, the power delivery controller, the first connecting port, and the second connecting port to receive a switching signal, and selectively electrically connects the power delivery controller to the first connecting port or the second connecting port according to the switching signal.

The power system according to the disclosure supports a plurality of connecting ports, to adapt to different operations. In addition, the power system in the disclosure supports individually charging and discharging operations of two connecting ports by using only one power delivery controller, thereby reducing the manufacturing costs.

DETAILED DESCRIPTION OF THE EMBODIMENTS

The specific embodiments of the disclosure are further described below in detail with reference to the schematic diagrams. According to the following descriptions and claims, advantages and features of the disclosure are clearer. It should be noted that, all the drawings are in a quite simplified form and not drawn to scale, and are only used for conveniently and clearly describing the objectives of the embodiments of the disclosure.

Figure 1:
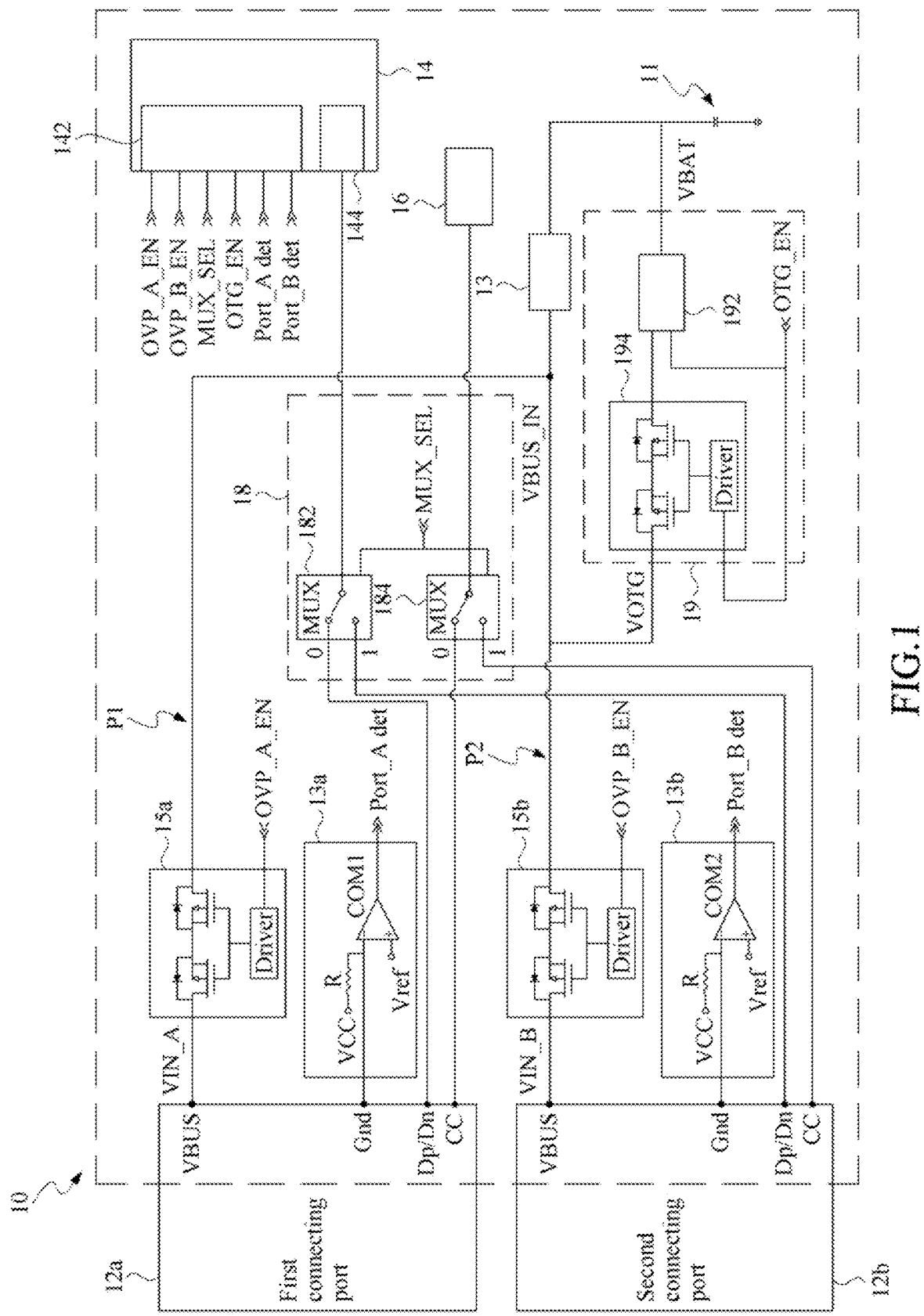
FIG. 1 is a schematic architectural diagram of a first embodiment of a power system according to the disclosure.

FIG. 1 is a schematic architectural diagram of a first embodiment of a power system according to the disclosure. The power system 10 is a universal serial bus (USB) power system, and is applied to a handheld device including a plurality of connecting ports, such as a mobile phone or a tablet.

As shown in the figure, the power system 10 includes a battery 11, a first connecting port 12a, a second connecting port 12b, a first charging path P1, a second charging path P2, a charging unit 13, a first detector 13a, a second detector 13b, a controller 14, a first over voltage protection unit 15a, a second over voltage protection unit 15b, a power delivery (PD) controller 16, a switching element 18, and an On-The-Go (OTG) power supply unit 19.

The first charging path P1 is electrically connected to the battery 11 and the first connecting port 12a. The second charging path P2 is electrically connected to the battery 11 and the second connecting port 12b. In an embodiment, both the first connecting port 12a and the second connecting port 12b are USB Type-C connecting ports. However, any connecting port for charging a handheld device is applicable to the disclosure.

In some other embodiments, the first connecting port 12a and the second connecting port 12b are connecting ports of different specifications. In an embodiment, the first connecting port 12a is a USB Type-C connecting port, and the second connecting port 12b is a USB Type-A connecting port. In an embodiment, the battery 11 is a rechargeable lithium battery.

The charging unit 13 is located on the first charging path P1 and the second charging path P2, and is electrically connected to the battery 11. The charging unit 13 receives external power through the first charging path P1 and the second charging path P2 to charge the battery 11. In an embodiment, taking a USB interface for example, the charging unit 13 is electrically connected to a power contact VBUS of the first connecting port 12a through the first charging path P1 to obtain external power, or is electrically connected to a power contact VBUS of the second connecting port 12b through the second charging path P2 to obtain external power.

The first over voltage protection unit 15a is disposed on the first charging path P1, to control a conduction status between the first connecting port 12a and the charging unit 13. The second over voltage protection unit 15b is disposed on the second charging path P2, to control a conduction status between the second connecting port 12b and the charging unit 13.

In an embodiment, the first over voltage protection unit 15a and the second over voltage protection unit 15b include a metal oxide semiconductor switch element. The first over voltage protection unit 15a and the second over voltage protection unit 15b not only serve as switch elements for controlling the conduction status between the first connecting port 12a and the charging unit 13 and the conduction status between the second connecting port 12b and the charging unit 13, but also provide over voltage protection for the first charging path P1 and the second charging path P2, to prevent an excessive charging voltage from damaging the power system 10 or other internal systems (not shown in the figure) of the handheld device.

The first detector 13a is electrically connected to the first connecting port 12a, to detect whether the first connecting port 12a is connected to an external device (not shown in the figure), and accordingly generate a first detection signal PORT_A det. The second detector 13b is electrically connected to the second connecting port 12b, to detect whether the second connecting port 12b is connected to an external device (not shown in the figure), and accordingly generate a second detection signal PORT_B det.

In an embodiment, the first detector 13a is electrically connected to a grounding contact Gnd of the first connecting port 12a, to detect whether the first connecting port 12a is connected to an external device. Similar to the first detector 13a, in an embodiment, the second detector 13b is electrically connected to a grounding contact Gnd of the second connecting port 12b, to detect whether the second connecting port 12b is connected to an external device.

In an embodiment, as shown in the figure, the first detector 13a includes a comparator COM1. The comparator COM1 includes a positive input end, a negative input end, and an output end. The positive input end receives a reference voltage Vref. The negative input end is electrically connected to the grounding contact Gnd of the first connecting port 12a, and is electrically connected to a power end VCC through a resistor R. The output end outputs the first detection signal PORT_A det. In this way, a detection result is known from whether a level of the first detection signal PORT_A det is high or low.

In an embodiment, when the first connecting port 12a is not connected to an external device, a level of the negative input end of the comparator COM1 is determined by a level of the power end VCC and is high. In this case, the output end of the comparator COM1 generates a first detection signal PORT_A det having a low level. When the first connecting port 12a is connected to an external device, the level of the negative input end of the comparator COM1 is determined by the grounding contact Gnd of the first connecting port 12a connected to the external device and is low. In this case, the output end of the comparator COM1 generates a first detection signal PORT_A det having a high level. Similar to the first detector 13a, the second detector 13b also includes a comparator COM2.

The controller 14 includes a control unit 142 and a data transmission controller 144. In an embodiment, the controller 14 is a micro controller.

The control unit 142 is electrically connected to the first detector 13a and the second detector 13b, to receive the first detection signal PORT_A det and the second detection signal PORT_B det, and controls conduction statuses of the first over voltage protection unit 15a and the second over voltage protection unit 15b according to the first detection signal PORT_A det and the second detection signal PORT_B det. In addition, the control unit 142 generates a switching signal MUX_SEL according to the first detection signal PORT_A det and the second detection signal PORT_B det, to control a switching state of the switching element 18. In an embodiment, the control unit 142 is a general-purpose output/input (GPIO) element.

The data transmission controller 144 is selectively electrically connected to the first connecting port 12a or the second connecting port 12b through the switching element 18, to communicate with an external device (such as a charger, an adaptor, or an OTG device) connected to the first connecting port 12a or the second connecting port 12b, to determine a power transmission mode between the power system 10 and the external device. In an embodiment, the data transmission controller 144 is a USB2.0 transmission control unit.

The power delivery controller 16 is selectively electrically connected to the first connecting port 12a or the second connecting port 12b through the switching element 18, to communicate with an external device (such as a charger, an adaptor, or an OTG device) connected to the first connecting port 12a or the second connecting port 12b, to determine a power transmission mode between the power system 10 and the external device. In an embodiment, the power delivery controller 16 is a power delivery control chip.

Taking a USB Type-C interface for example, the power delivery controller 16 communicates with an external device through a channel configuration (CC) contact CC of the first connecting port 12a or the second connecting port 12b, and the data transmission controller 144 communicates with an external device through a data contact Dp/Dn of the first connecting port 12a or the second connecting port 12b.

Through the configuration of the data transmission controller 144 and the power delivery controller 16, the power system not only supports a connecting port and an external device of the USB type-C specification, but also supports a connecting port and an external device of the USB type-A specification.

The switching element 18 is electrically connected to the control unit 142, the data transmission controller 144, the power delivery controller 16, the first connecting port 12a, and the second connecting port 12b, to receive the switching signal MUX_SEL, and selectively electrically connects the data transmission controller 144 and the power delivery controller 16 to the first connecting port 12a or the second connecting port 12b according to the switching signal MUX_SEL.

In an embodiment, when the switching signal MUX_SEL indicates that only the first connecting port 12a is connected to an external device, the switching element 18 electrically connects the data transmission controller 144 and the power delivery controller 16 to the first connecting port 12a according to the switching signal MUX_SEL. In an embodiment, the switching signal MUX_SEL is a digital signal. In another embodiment, the switching signal MUX_SEL is an analog signal.

In this embodiment, the switching element 18 includes a first multiplexer 182 and a second multiplexer 184. The first multiplexer 182 is electrically connected to the control unit 142, the power delivery controller 16, the first connecting port 12a, and the second connecting port 12b, to receive the switching signal MUX_SEL, and selectively electrically connects the power delivery controller 16 to the first connecting port 12a or the second connecting port 12b according to the switching signal MUX_SEL. The second multiplexer 184 is electrically connected to the control unit 142, the data transmission controller 144, the first connecting port 12a, and the second connecting port 12b, to receive the switching signal MUX_SEL, and selectively electrically connects the data transmission controller 144 to the first connecting port 12a or the second connecting port 12b according to the switching signal MUX_SEL.

The OTG power supply unit 19 is electrically connected to the control unit 142 and the battery 11. The control unit 142 generates an OTG enable signal OTG_EN according to the first detection signal PORT_A det and the second detection signal PORT_B det. The OTG power supply unit 19 determines, according to the OTG enable signal OTG_EN, whether to enable an OTG function of the power system 10. After the OTG function is enabled, the OTG power supply unit 19 converts a battery voltage VBAT provided by the battery 11 into an OTG voltage VOTG and provides the OTG voltage VOTG to an external OTG device (not shown in the figure).

In an embodiment, as shown in the figure, the OTG power supply unit 19 includes an OTG voltage converter 192 and an OTG switch element 194. The OTG voltage converter 192 is electrically connected to the battery 11, to convert the battery voltage VBAT into an OTG voltage VOTG (which is 5 V in an embodiment). The OTG switch element 194 is disposed at an output end of the OTG voltage converter 192, and a conduction status of the OTG switch element 194 is determined according to the OTG enable signal OTG_EN, so that the OTG voltage VOTG is provided to the external OTG device through the first charging path P1 or the second charging path P2. In an embodiment, the OTG switch element 194 is an over voltage protection circuit. In an embodiment, the OTG voltage converter 192 is a boost converter.

Figure 2:
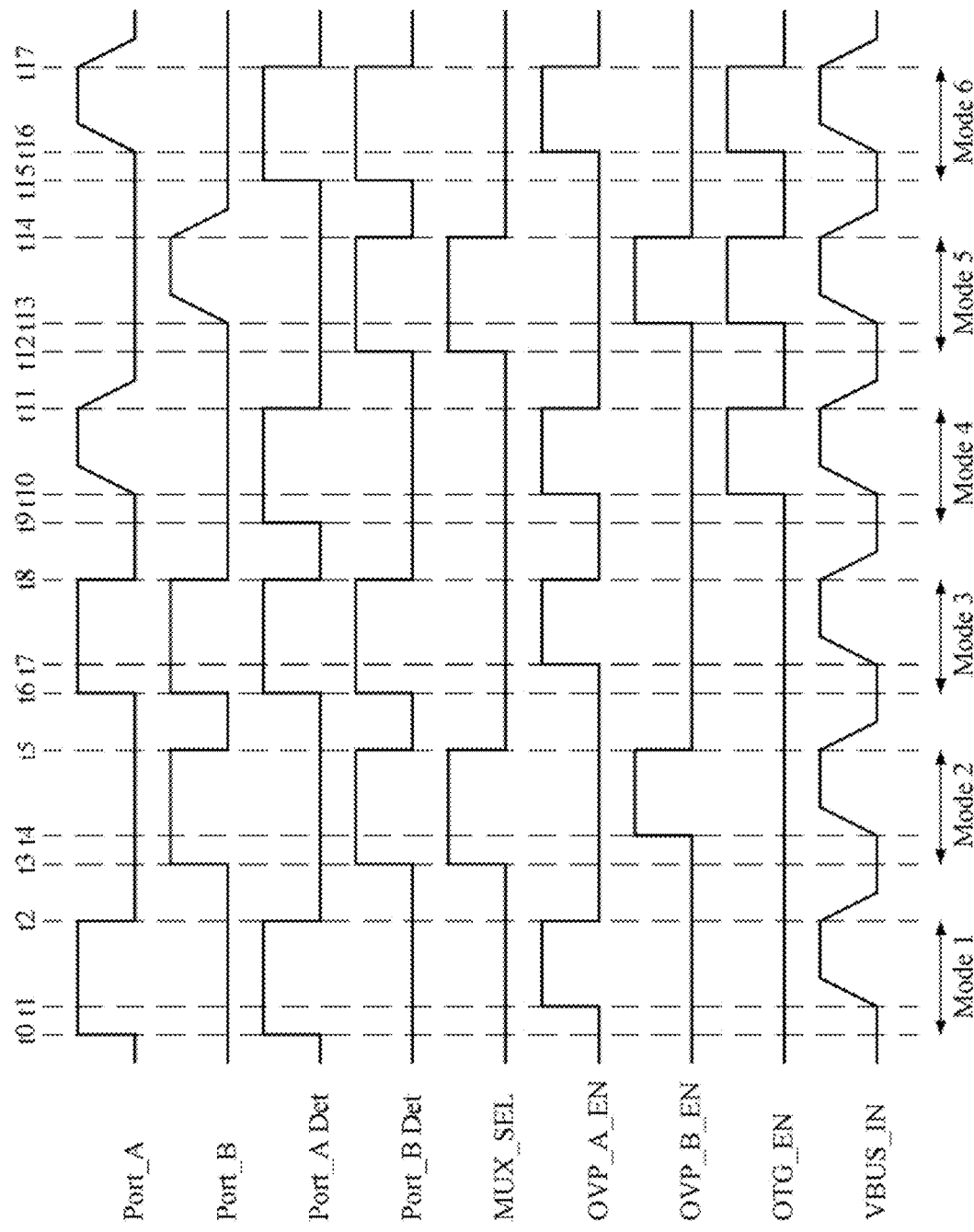
FIG. 2 is a sequence diagram showing various operation modes of the power system in FIG. 1 and corresponding signals.

Referring to FIG. 2, FIG. 2 is a sequence diagram showing various operation modes of the power system in FIG. 1 and corresponding signals. As shown in the figure, the power system includes a total of six operation modes, which are described below in detail.

Mode 1 (Charging Mode Using the First Connecting Port):

The mode 1 corresponds to time points t0 to t2. At the time point t0, when a charger (not shown in the figure) is inserted in the first connecting port 12a, the first detector 13a detects that the first connecting port 12a is connected to an external device (that is, the charger) and outputs a first detection signal Port_A det having a high level to the control unit 142.

In this case, the first over voltage protection unit 15a is not conducting, and an input end VBUS_IN of the charging unit 13 is zero. Upon receiving the first detection signal Port_A det having a high level, the control unit 142 sets the switching signal MUX_SEL to a binary number 0, and controls the switching element 18 to conduct a circuit between the power delivery controller 16 and the first connecting port 12a and a circuit between the data transmission controller 144 and the first connecting port 12a, so that the power delivery controller 16 and the data transmission controller 144 communicate with the charger to establish a charging protocol.

In an embodiment, for a USB Type-C interface, the power delivery controller 16 communicates with the charger through the channel configuration contact CC of the first connecting port 12a, and the data transmission controller 144 communicates with the charger through the data contact Dp/Dn of the first connecting port 12a.

After the charging protocol is established (that is, at the time point t1), the control unit 142 outputs a first switch control signal OVP_A_EN having a high level to the first over voltage protection unit 15a to conduct the first charging path P1, and outputs a second switch control signal OVP_B_EN having a low level to the second over voltage protection unit 15b to cut off the second charging path P2. In this way, an input voltage VIN_A from the first connecting port 12a is delivered to the input end VBUS_IN of the charging unit 13 to charge the battery 11.

Mode 2 (Charging Mode Using the Second Connecting Port)

The mode 2 corresponds to time points t3 to t5. At the time point t3, when a charger (not shown in the figure) is inserted in the second connecting port 12b, the second detector 13b detects that the second connecting port 12b is connected to an external device (that is, the charger) and outputs a second detection signal Port_B det having a high level to the control unit 142.

In this case, the second over voltage protection unit 15b is not conducting, and the input end VBUS_IN of the charging unit 13 is zero. Upon receiving the second detection signal Port_B det having a high level, the control unit 142 sets the switching signal MUX_SEL to a binary number 1, and controls the switching element 18 to conduct a circuit between the power delivery controller 16 and the second connecting port 12b and a circuit between the data transmission controller 144 and the second connecting port 12b, so that the power delivery controller 16 and the data transmission controller 144 communicate with the charger to establish a charging protocol.

After the charging protocol is established (that is, at the time point t4), the control unit 142 outputs a first switch control signal OVP_A_EN having a low level to the first over voltage protection unit 15a to cut off the first charging path P1, and outputs a second switch control signal OVP_B_EN having a high level to the second over voltage protection unit 15b to conduct the second charging path P2. In this way, an input voltage VIN_B from the second connecting port 12b is delivered to the input end VBUS_IN of the charging unit 13 to charge the battery 11.

Mode 3 (Charging Mode Preferentially Using the First Connecting Port)

The mode 3 corresponds to time points t6 to t8. At the time point t6, when a charger is inserted in each of the first connecting port 12a and the second connecting port 12b, the first detector 13a detects that the first connecting port 12a is connected to an external device (that is, a charger) and outputs a first detection signal Port_A det having a high level to the control unit 142, and the second detector 13b also detects that the second connecting port 12b is connected to an external device (that is, a charger) and outputs a second detection signal Port_B det having a high level to the control unit 142.

The control unit 142 sets in advance a highest priority for the first connecting port 12a. Therefore, the control unit 142 sets the switching signal MUX_SEL to a binary number 0, and controls the switching element 18 to conduct a circuit between the power delivery controller 16 and the first connecting port 12a and a circuit between the data transmission controller 144 and the first connecting port 12a, so that the power delivery controller 16 and the data transmission controller 144 communicate with the charger to establish a charging protocol.

After the charging protocol is established (that is, at the time point t7), the control unit 142 outputs a first switch control signal OVP_A_EN having a high level to the first over voltage protection unit 15a to conduct the first charging path P1, and outputs a second switch control signal OVP_

B_EN having a low level to the second over voltage protection unit 15b to cut off the second charging path P2. In this way, an input voltage VIN_A from the first connecting port 12a is delivered to the input end VBUS_IN of the charging unit 13 to charge the battery 11.

Mode 4 (OTG Mode Using the First Connecting Port)

The mode 4 corresponds to time points t9 to t11. At the time point t9, when an OTG device is inserted in the first connecting port 12a, the first detector 13a detects that the first connecting port 12a is connected to an external device (that is, the OTG device) and outputs a first detection signal Port_A det having a high level to the control unit 142. Upon receiving the first detection signal Port_A det having a high level, the control unit 142 sets the switching signal MUX_SEL to a binary number 0, and controls the switching element 18 to conduct a circuit between the power delivery controller 16 and the first connecting port 12a and a circuit between the data transmission controller 144 and the first connecting port 12a.

Then, the control unit 142 detects through the first connecting port 12a that a device connected to the first connecting port 12a is an OTG device. In an embodiment, for a USB Type-C interface, the control unit 142 detects the external device through the power delivery controller 16 and the channel configuration contact CC of the first connecting port 12a, or detects the external device through the data transmission controller 144 and the data contact Dp/Dn of the first connecting port 12a.

After determining that the external device is an OTG device (that is, at the time point t10), the control unit 142 outputs a first switch control signal OVP_A_EN having a high level to the first over voltage protection unit 15a to conduct the first charging path P1, and outputs a second switch control signal OVP_B_EN having a low level to the second over voltage protection unit 15b to cut off the second charging path P2. In addition, the control unit 142 outputs an OTG enable signal OTG_EN having a high level, to enable the OTG power supply unit 19, so that the OTG power supply unit 19 provides, through the first charging path P1, a voltage (which is generally 5 V) required by the OTG device.

Mode 5 (OTG Mode Using the Second Connecting Port)

The mode 5 corresponds to time points t12 to t14. At the time point t12, when an OTG device is inserted in the second connecting port 12b, the second detector 13b detects that the second connecting port 12b is connected to an external device (that is, the OTG device) and outputs a second detection signal Port_B det having a high level to the control unit 142. Upon receiving the second detection signal Port_B det having a high level, the control unit 142 sets the switching signal MUX_SEL to a binary number 1, and controls the switching element 18 to conduct a circuit between the power delivery controller 16 and the second connecting port 12b and a circuit between the data transmission controller 144 and the second connecting port 12b.

Then, the control unit 142 detects through the second connecting port 12b that a device connected to the second connecting port 12b is an OTG device. In an embodiment, for a USB Type-C interface, the control unit 142 detects the external device through the power delivery controller 16 and the channel configuration contact CC of the second connecting port 12b, or detects the external device through the data transmission controller 144 and the data contact Dp/Dn of the second connecting port 12b.

After determining that the external device is an OTG device (that is, at the time point t13), the control unit 142 outputs a first switch control signal OVP_A_EN having a low level to the first over voltage protection unit 15a to cut off the first charging path P1, and outputs a second switch control signal OVP_B_EN having a high level to the second over voltage protection unit 15b to conduct the second charging path P2. In addition, the control unit 142 outputs an OTG enable signal OTG_EN having a high level, to enable the OTG power supply unit 19, so that the OTG power supply unit 19 provides, through the second charging path P2, a voltage required by the OTG device.

Mode 6 (OTG Mode Preferentially Using the First Connecting Port)

The mode 6 corresponds to time points t15 to t17. At the time point t15, when an OTG device is inserted in the first connecting port 12a and an OTG device is inserted in the second connecting port 12b, the first detector 13a detects that the first connecting port 12a is connected to an external device (that is, an OTG device) and outputs a first detection signal Port_A det having a high level to the control unit 142, and the second detector 13b detects that the second connecting port 12b is connected to an external device (that is, an OTG device) and outputs a second detection signal Port_B det having a high level to the control unit 142.

The control unit 142 sets in advance a highest priority for the first connecting port 12a. Therefore, the control unit 142 sets the switching signal MUX_SEL to a binary number 0, and controls the switching element 18 to conduct a circuit between the power delivery controller 16 and the first connecting port 12a and a circuit between the data transmission controller 144 and the first connecting port 12a. Then, the control unit 142 detects through the first connecting port 12a that the device connected to the first connecting port 12a is an OTG device.

After determining that the external device is an OTG device (that is, at the time point t16), the control unit 142 outputs a first switch control signal OVP_A_EN having a high level to the first over voltage protection unit 15a to conduct the first charging path P1, and outputs a second switch control signal OVP_B_EN having a low level to the second over voltage protection unit 15b to cut off the second charging path P2. In addition, the control unit 142 outputs an OTG enable signal OTG_EN having a high level, to enable the OTG power supply unit 19, so that the OTG power supply unit 19 provides, through the first charging path P1, a voltage (which is generally 5 V) required by the OTG device.

In the foregoing mode 3 and mode 6, a highest priority is set in advance for the first connecting port 12a. In an embodiment, a highest priority is set for the second connecting port 12b, and the corresponding operation mode is similar to that in the foregoing mode 3 and mode 6 and therefore will not be described herein again.

Figure 3:
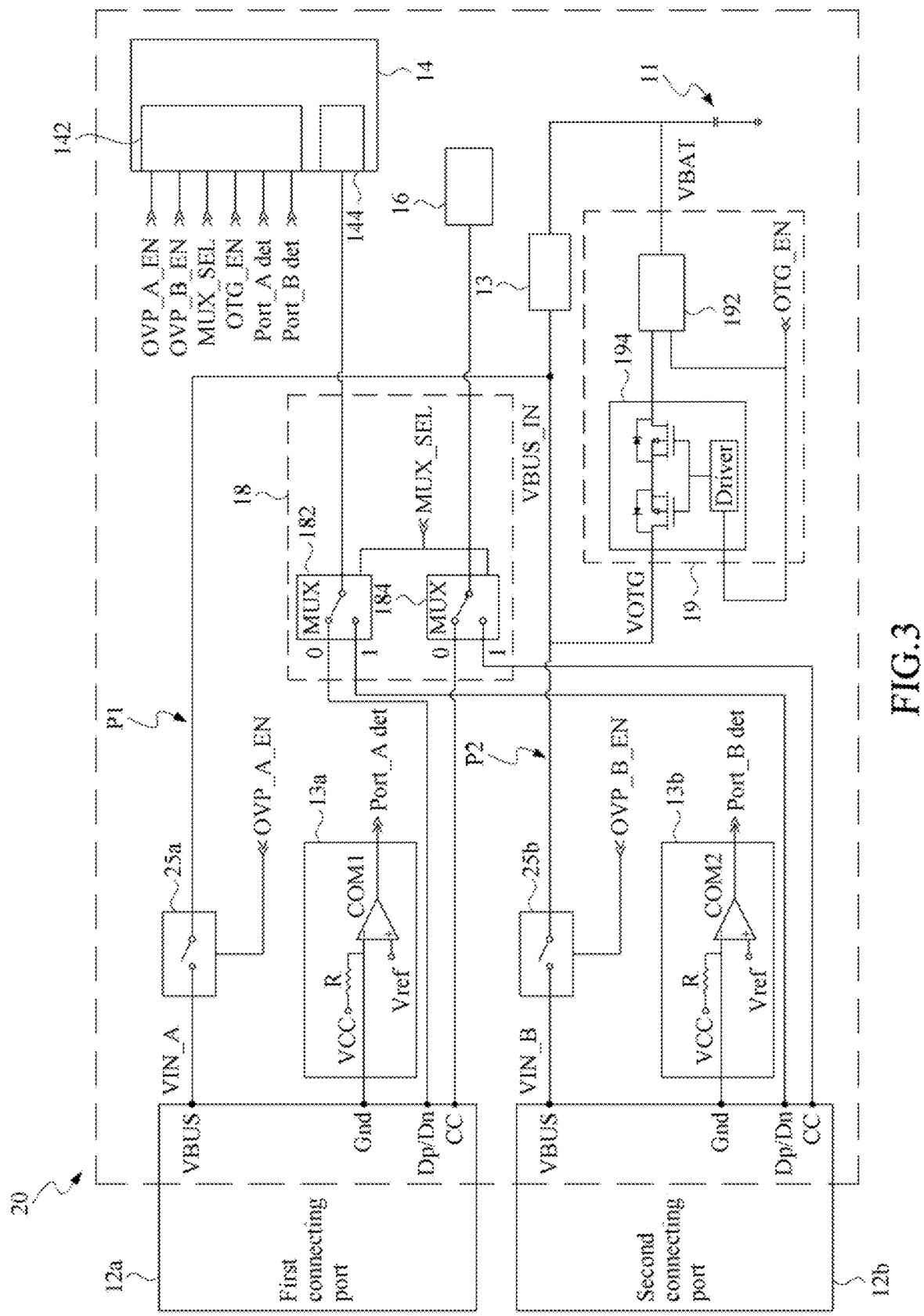
FIG. 3 is a schematic architectural diagram of a second embodiment of a power system according to the disclosure.

FIG. 3 is a schematic architectural diagram of a second embodiment of a power system according to the disclosure. Compared with the embodiment of FIG. 1, a power system 20 in this embodiment uses a first switch element 25a and a second switch element 25b to replace the first over voltage protection unit 15a and the second over voltage protection unit 15b in FIG. 1.

Similar to the first over voltage protection unit 15a and the second over voltage protection unit 15b, the control unit 142 selectively enables the first switch element 25a and the second switch element 25b according to the first detection signal PORT_A det and the second detection signal PORT_B det, to control conduction statuses of the first charging path P1 and the second charging path P2. The first switch element 25a and the second switch element 25b have simpler architectures than those of the first over voltage protection unit 15a and the second over voltage protection unit 15b. Other parts of the architecture of the power system 20 in this embodiment are basically the same as those of the power system 10 shown in FIG. 1, and will not be described herein again.

Figure 4:
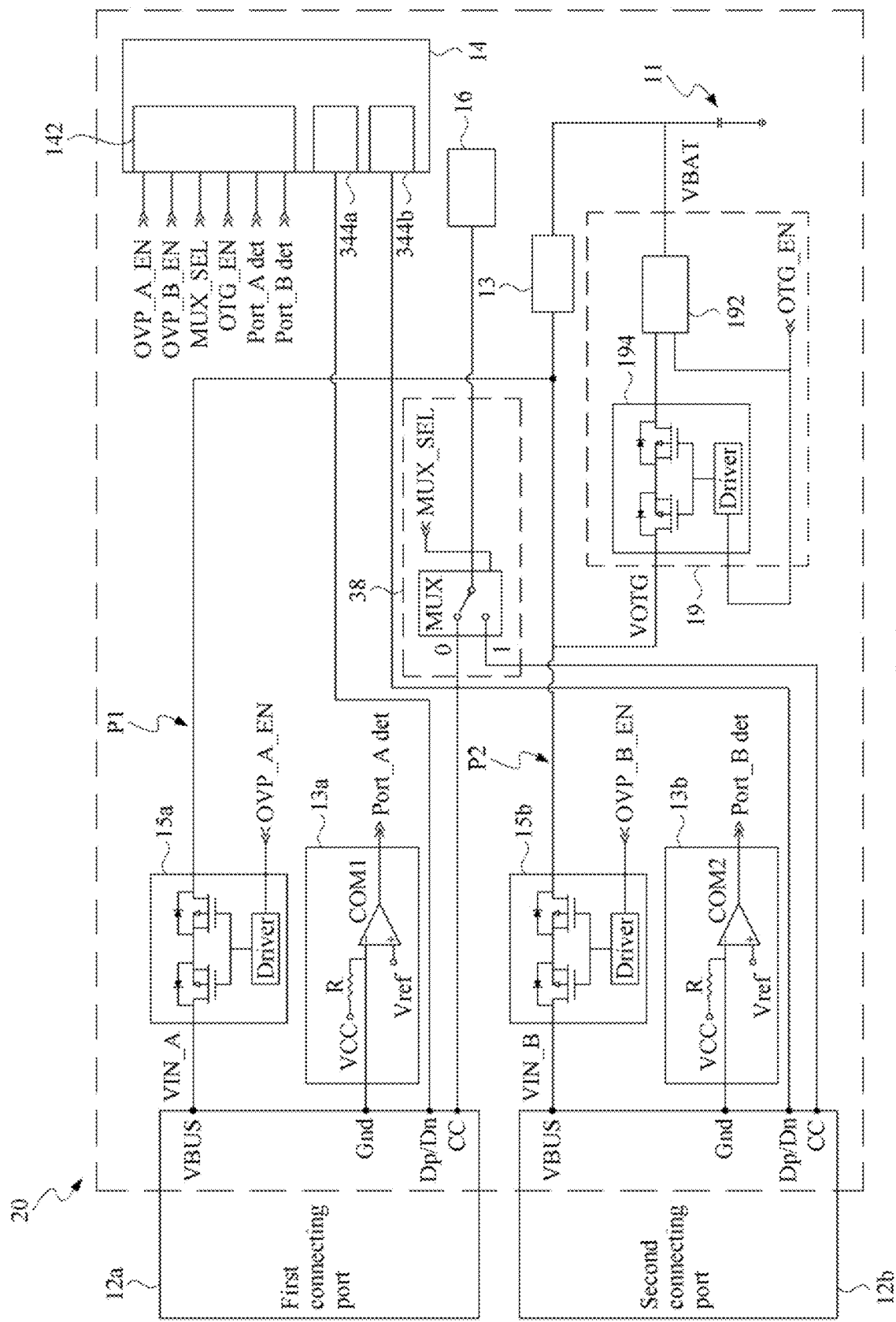
FIG. 4 is a schematic architectural diagram of a third embodiment of a power system according to the disclosure.

FIG. 4 is a schematic architectural diagram of a third embodiment of a power system according to the disclosure. Compared with the embodiment of FIG. 1, the switching element 38 of the power system 30 in this embodiment includes only one multiplexer to control the conduction status between the power delivery controller 16 and the first connecting port 12a or the second connecting port 12b. Two data transmission controllers 344a and 344b are used, which are respectively connected to the first connecting port 12a and the second connecting port 12b. Other parts of the architecture of the power system 30 in this embodiment are basically the same as those of the power system 10 shown in FIG. 1, and will not be described herein again.

In conclusion, the power systems 10, 20, and 30 applied to a handheld device according to the disclosure support a plurality of connecting ports 12a and 12b, to adapt to different use habits of users. In addition, the power systems 10, 20, and 30 according to the disclosure support respective charging and discharging operations of two connecting ports 12a and 12b by using only one power delivery controller 16, and there is no need to dispose one power delivery controller 16 for each of the connecting ports 12a and 12b, thereby reducing the manufacturing costs.

The foregoing descriptions are merely exemplary embodiments of the disclosure, and do not limit the disclosure. Any equivalent replacement or modification made to the technical means and the technical content disclosed by the disclosure by any person skilled in the art without departing from the scope of the technical means of the disclosure shall fall within the protection scope of the disclosure.

What is claimed is:

1. A power system, applied to a handheld device, comprising:
   a battery;
   a first connecting port;
   a second connecting port;
   a first charging path, electrically connected to the battery and the first connecting port;
   a second charging path, electrically connected to the battery and the second connecting port;
   a first detector, electrically connected to the first connecting port to generate a first detection signal;
   a second detector, electrically connected to the second connecting port to generate a second detection signal;
   a power delivery controller;
   a control unit, electrically connected to the first detector and the second detector to receive the first detection signal and the second detection signal, generating a switching signal according to the first detection signal and the second detection signal, and controlling conduction statuses of the first charging path and the second charging path;
   a switching element, electrically connected to the control unit, the power delivery controller, the first connecting port, and the second connecting port to receive the switching signal, and selectively electrically connecting the power delivery controller to the first connecting port or the second connecting port according to the switching signal; and
   an On-The-Go (OTG) power supply unit, electrically connected to the control unit and the battery, wherein the control unit generates an OTG enable signal according to the first detection signal and the second detection signal, and the OTG power supply unit converts a battery voltage provided by the battery into an OTG voltage according to the OTG enable signal and outputs the OTG voltage.

2. The power system according to claim 1, further comprising a charging unit, electrically connected to the battery, to receive external power through the first charging path or the second charging path to charge the battery.

3. The power system according to claim 1, further comprising a first switch element, disposed on the first charging path, wherein the control unit controls the conduction status of the first switch element according to the first detection signal and the second detection signal.

4. The power system according to claim 3, further comprising a second switch element, disposed on the second charging path, wherein the control unit controls the conduction status of the second switch element according to the first detection signal and the second detection signal.

5. The power system according to claim 1, further comprising a first over voltage protection unit, disposed on the first charging path, wherein the control unit selectively enables the first over voltage protection unit according to the first detection signal and the second detection signal.

6. The power system according to claim 5, further comprising a second over voltage protection unit, disposed on the second charging path, wherein the control unit selectively enables the second over voltage protection unit according to the first detection signal and the second detection signal.

7. The power system according to claim 1, wherein the first connecting port is a USB Type-C connecting port.

8. The power system according to claim 1, wherein the second connecting port is a USB Type-C connecting port.

9. The power system according to claim 1, further comprising a data transmission controller, wherein the switching element is electrically connected to the data transmission controller, and selectively electrically connects the data transmission controller to the first connecting port or the second connecting port according to the switching signal.

10. The power system according to claim 9, wherein the switching element comprises a first multiplexer and a second multiplexer, the first multiplexer is electrically connected to the control unit, the power delivery controller, the first connecting port, and the second connecting port, and selectively electrically connects the power delivery controller to the first connecting port or the second connecting port according to the switching signal, and the second multiplexer is electrically connected to the control unit, the data transmission controller, the first connecting port, and the second connecting port, and selectively electrically connects the data transmission controller to the first connecting port or the second connecting port according to the switching signal.

11. The power system according to claim 1, wherein the second connecting port is a USB Type-A connecting port.

* * * * *